(12) United States Patent
Pizot et al.

(10) Patent No.: US 12,375,292 B2
(45) Date of Patent: Jul. 29, 2025

(54) SERVER TO SYNCHRONIZE A DIGITAL AVATAR WITH A DEVICE BASED ON ITEMS OF INFORMATION WRAPPED TOGETHER

(71) Applicant: Hewlett-Packard Development Company, L.P., Spring, TX (US)

(72) Inventors: Laurent Paul Henri Pizot, Vancouver, WA (US); Sudhindra Venkatesh Kulkarni, Bangalore (IN); Vishwanath Rn, Bangalore (IN); Prabha Rangaswamy, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 342 days.

(21) Appl. No.: 18/028,833

(22) PCT Filed: Jul. 1, 2021

(86) PCT No.: PCT/US2021/070813
§ 371 (c)(1),
(2) Date: Mar. 28, 2023

(87) PCT Pub. No.: WO2022/072957
PCT Pub. Date: Apr. 7, 2022

(65) Prior Publication Data
US 2023/0336360 A1 Oct. 19, 2023

(30) Foreign Application Priority Data
Oct. 1, 2020 (IN) .............................. 202041042690

(51) Int. Cl.
*H04L 9/32* (2006.01)

(52) U.S. Cl.
CPC ................................. *H04L 9/3247* (2013.01)

(58) Field of Classification Search
CPC ........................... H04L 9/3247; G06F 21/6209
See application file for complete search history.

(56) References Cited

U.S. PATENT DOCUMENTS

| 10,057,738 B2 | 8/2018 | Schmit et al. |
| 2016/0149836 A1 | 5/2016 | Narayanan et al. |
| 2017/0286572 A1 | 10/2017 | Hershey et al. |

(Continued)

FOREIGN PATENT DOCUMENTS

| CN | 110320873 A | 10/2019 |
| CN | 111240209 A | 6/2020 |

*Primary Examiner* — Mohammad W Reza
(74) *Attorney, Agent, or Firm* — Brooks, Cameron & Huebsch, PLLC

(57) ABSTRACT

A server includes a memory to store instructions, and a processor, coupled to the memory, to execute the instructions to cause the server to receive a wrapper which includes a plurality of items of information. The plurality of items of information are encrypted and pertain to a state of a device which is remotely located from the server, and include at least one item of information regarding a resource or functionality of the device. The processor may execute the instructions to cause the server to decrypt the wrapper including the plurality of items of information, unwrap and de-aggregate the plurality of items of information from the wrapper, and transmit the plurality of items of information to a digital avatar which virtually represents the device to synchronize a state of the digital avatar with the state of the device.

15 Claims, 8 Drawing Sheets

(56) References Cited

U.S. PATENT DOCUMENTS

| | | |
|---|---|---|
| 2018/0198606 A1 | 7/2018 | Le Saint et al. |
| 2019/0087598 A1 | 3/2019 | Adkins et al. |
| 2020/0125053 A1 | 4/2020 | Park et al. |
| 2020/0142365 A1 | 5/2020 | Sharma et al. |
| 2020/0177618 A1 | 6/2020 | Hassanzadeh et al. |
| 2021/0286325 A1 | 9/2021 | Liu et al. |

FIG. 7

```
request
POST /resourceAggregator HTTP/1.1                    7060
Authorization: Basic Q1AxMjM0NTY3ODoAAQIDVEVTVCBLRVkDAgEA
JSON Web Encryption({
   "version": "1.0.0",
7050  "subscriptionId": "fe6af1dd-8781-45c0-836b-53c1fc2d12d7",
   "physicalDeviceResources": [
    {
      "seqNum": 3,      7010                  7020
      "eTag": "1000001",
      "resourceId": "be7db12a-a535-4532-8f44-3e074d6d614d",
      "path": "/path/to/resource/be7db12a-a535-4532-8f44-3e074d6d614d",
      "operation": "replace",
      "data": {
        "version": "1.0.0",
        # Delta of resource state
        # using JSON Merge Patch
      }
    },
    {
      "seqNum": 4,                            7030
      "eTag": "1000026",
      "resourceId": "96bc8384-3e1e-424c-b71a-e96b47dcfd85",
      "path": "/path/to/resource/96bc8384-3e1e-424c-b71a-e96b47dcfd85",
      "operation": "update",
      "data": {
        "version": "1.2.0",
        # Delta of resource state
        # using JSON Merge Patch
      }
    },
    {
      "seqNum": 5,                            7040
      "eTag": "1000129",
      "resourceId": "bad39200-c7b0-49a1-878f-31c50047c499",
      "path": "path/to/resource/bad39200-c7b0-49a1-878f-31c50047c499",
      "operation": "update",
      "data": {
        "version": "2.3.0",
        # Delta of resource state
        # using JSON Merge Patch
      }
    }
  ]
}) End of JWE wrapper         7000
```

FIG. 8

```
reply                             8020
HTTP/1.1 200 OK
Content-Type: application/jose
JSON Web Encryption wrapper (
{
  "version": "1.0.0",
  "digitalAvatarResources": [       8010
    {
      "resourceId": "96bc8384-3e1e-424c-
b71a-e96b47dcfd85",
      "ifMatch": "1000026",
      "path": "/path/to/resource/96bc8384-
3e1e-424c-b71a-e96b47dcfd85",
      "operation": "update",
      "data": {
        "version": "1.2.0",
        # Delta of resource state
        # using JSON Merge Patch
      }
    }
  ]
}
) end of JWE wrapper
```

<u>8000</u>

SERVER TO SYNCHRONIZE A DIGITAL AVATAR WITH A DEVICE BASED ON ITEMS OF INFORMATION WRAPPED TOGETHER

BACKGROUND

A cloud computing network may include a network of remote computer system resources, for example remote server computing devices, that may be available to other computing devices via the Internet. Cloud computing may be public when a cloud service provider provides cloud computing services or resources which are shared by many different users or organizations. Cloud computing may be private when the cloud computing services or resources are owned or controlled by specific users or organizations. The cloud computing network of remote computer system resources may be used to store, manage, and process data or information, instead of having such functions being performed and maintained locally, which can reduce costs for a user or organization.

An Internet of Things (IoT) device may refer to a hardware device, vehicle, building, or other object which includes electronics, instructions, sensors, and/or network connections, that enable the IoT device to exchange information or data with other devices over the internet, for example over a cloud computing network. For example, internet connectivity may be extended to non-internet-enabled physical devices and objects, such as image forming apparatuses (e.g., a printer, scanner, copier, or a multifunction peripheral device), industrial equipment, environmental sensors, medical devices, vehicles, home appliances, and the like.

BRIEF DESCRIPTION OF THE DRAWINGS

FIG. 7 is an example table illustrating performance parameters for different features of a software application and for different versions of the software application.

FIG. 8 is an example response communicated from the platform to the physical device according to an example of the disclosure.

DETAILED DESCRIPTION

Figure 1:
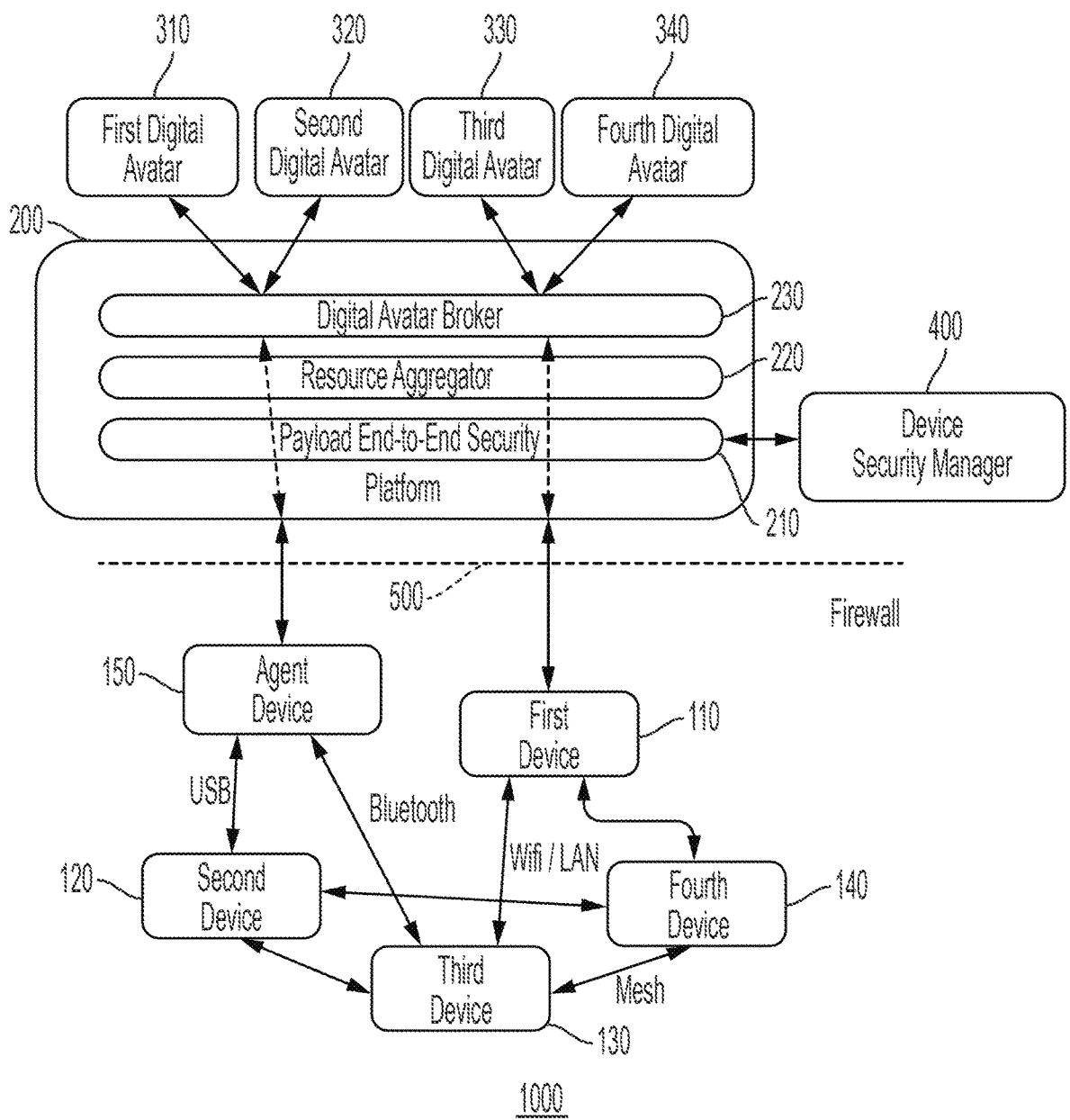
FIG. 1 is an example process by which a user can obtain a recommendation for a service level agreement.

Various examples of the disclosure will now be described with reference to the accompanying drawings, wherein like reference characters denote like elements. Examples to be explained in the following may be modified and implemented in various different forms.

When it is stated in the disclosure that one element is "connected to" or "coupled to" another element, the expression encompasses an example of a direct connection or direct coupling, as well as a connection with another element interposed therebetween. Further, when it is stated herein that one element "includes" another element, unless otherwise stated explicitly, it means that yet another element may be further included rather than being excluded.

A digital avatar (digital twin) virtually represents a physical device, for example in a cloud computing network setting, and exposes resources and functionalities of the physical device to solutions which may not have direct access to the physical device, for example, via the internet. IoT platforms (cloud platforms) may not support physical devices without WIFI or Ethernet or LAN technologies and may not guaranty end-to-end data security. Therefore, the IoT platforms may not allow for aggregating of updates or changes regarding states of a physical device. This may result in multiple transactions over the internet to update or change the resources and functionalities of the digital avatar which represents the physical device. Likewise, updates or changes to be made to the physical device from a client device via the digital avatar may also result in multiple transactions over the internet to update or change the resources and functionalities of the physical device.

Described herein are a cloud platform and method by which a complete synchronization between a physical device and its corresponding digital avatar may be performed in an efficient and secure manner. The cloud platform (e.g., a server) and method includes a protocol and a mechanism by which multiple transactions (state transitions) may be aggregated and wrapped together to minimize the number of exchanges between the physical device and its corresponding digital avatar. For example, the physical device may aggregate and wrap together a plurality of items of information regarding the state of the physical device in a wrapper, and transmit the wrapper to the cloud platform so that a state of the digital avatar virtually representing the physical device may be synchronized with the state of the physical device. Likewise, the cloud platform may aggregate and wrap together a plurality of items of information to change or update the state of the physical device in a wrapper, and transmit the wrapper to the physical device so that a state of the physical device is changed or updated and synchronized with a state of the digital avatar virtually representing the physical device.

The transactions or state transitions may include a plurality of items of information about the physical device regarding a state of the physical device and may include an item of information regarding a resource or functionality of the physical device.

The protocol employed by the cloud platform and method is versatile and may report deltas or complete information of the physical device based on a negotiation between the cloud platform and the physical device. For example, the mechanism described herein may optimize a complete and secure synchronization between the physical device and its digital avatar in one transaction exchange.

The cloud platform and method described herein may provide a secure payload encryption and signing (for example, by using a Rivest-Shamir-Adleman (RSA) or Elliptic-curve cryptography (ECC) public key cryptography). The synchronization payload may be transmitted over multiple unsecure and/or untrusted nodes over a mesh configuration, over on-premises software, via third-party cloud proxies, or combinations thereof. The cloud platform and method may also employ an authentication and authorization scheme to subscribe the digital avatar to its corresponding physical device and may allow the digital avatar to access the resources of the corresponding physical device if the digital avatar is authorized to access those resources.

Referring now to FIG. 1, an example network is illustrated according to an example of the disclosure.

The network may include a plurality of devices 110 through 150 which reside in a home, local, and/or enterprise network and are firewalled by firewall 500 and are remotely located from a platform 200 (cloud platform) provided on a cloud computing network. The platform 200 may monitor and manage the plurality of devices 110 through 150, for example.

For example, first through fourth devices 110-140 may correspond to IoT devices, which may be connected to one another through a mesh network. Device 150 may correspond to an agent device, which may include, for example a smartphone or software premises agent. Devices which may not be able to, or be capable of, connecting to the internet may rely on the agent device 150 to relay digital avatar synchronization data between the device and its corresponding digital avatar, via platform 200. As another example, access to the internet or cloud computing network may be limited or prevented for some devices, and agent device 150 may be designated as a control or choke point for communications to be transmitted to the platform 200.

As illustrated in FIG. 1, second device 120 may be connected to agent device 150 via a USB connection, and agent device 150 may relay digital avatar synchronization data between second device 120 and its corresponding digital avatar, e.g., second avatar 320, via platform 200. As another example, third device 130 may be connected to agent device 150 via a BLUETOOTH connection, and agent device 150 may relay digital avatar synchronization data between third device 130 and its corresponding digital avatar, e.g., third avatar 330, via platform 200

In a mesh topology or mesh network, devices (also referred to as nodes) may connect directly, dynamically, and non-hierarchically to other devices and cooperate with one another to efficiently route information. In the mesh network, the devices may dynamically self-organize and self-configure to distribute workloads, for example. In the mesh network, a device may be configured or selected to act as a master device for other devices, for example for proxying purposes, for converging network traffic through a designated access, control, or choke point, and the like. For example, first device 110 may be configured or selected as a proxy device for other devices. For example, first device 110 may be configured as a proxy for third device 130 and fourth device 140 according to a policy or protocol. According to various techniques, another device can subsequently and dynamically be promoted to become a master proxy device. According to examples described herein, a device which may not be able to connect to the internet may still be able to transmit and/or receive information to and from the platform 200, via the mesh network or other non-internet connectivity media. Other non-internet connectivity media may include BLUETOOTH, BLUETOOTH Low Energy, USB, or other near field or mesh technologies, and the like.

Platform 200 may be a cloud platform which monitors and manages devices via the internet in a cloud computing network. The platform 200 may include a server, for example. The platform 200 may provide a service by which IoT devices that may or may not have a persistent connection to the platform 200 may be synchronized with its digital avatar.

As mentioned above, the digital avatar is a virtual representation of a corresponding physical device (e.g., an IoT device). The digital avatar may expose resources and functionalities of a corresponding physical device to a solution (e.g., a computer program or application) that may not have direct access to the physical device. The platform 200 may host the digital avatar, or the digital avatar may be hosted by another platform, or reside on a client device implementing the solution.

The physical device may include an aggregation of states which describe the physical device's configuration, state transitions, actions, and may include data collection/telemetry of the physical device. The platform 200 may provide configurable access to the resources of the physical device, for example, over untrusted proxies in a large scale heterogeneous environment.

Synchronization of the states of the physical device with the digital avatar may need to be performed in a timely fashion according to, for example, performance criteria, user expectations, and the like. In complex devices, the amount of information to be synchronized may be significant, and thus sending each state transition of the physical device one by one may not meet timing criteria or user expectations, for example. Synchronization may occur bi-directionally, i.e., from device-to-digital avatar, and from digital avatar-to-device. As discussed herein, the platform 200 and physical device may include features which enable state information of the digital avatar and/or device to be synchronized in a timely and efficient manner which may reduce network traffic, optimize bandwidth usage, and reduce costs. In FIG. 1, the physical device may be any of devices 110 through 150, according to an example.

Referring again to FIG. 1, the platform 200 may include a service that is performed or run, for example, using a hosted infrastructure of the platform (e.g., a processor 250 and storage 260 of FIG. 2) to execute a computer program or application which includes instructions that may correspond to the functional modules of payload end-to-end security 210, resource aggregator 220, and a digital avatar broker 230.

In an example described below, the physical device is first device 110. For example, the first device 110 may experience a plurality of state transitions which are to be reported to the platform 200 so that the state of the corresponding first digital avatar 310 may be synchronized with the state of the first device 110. In some circumstances, each state transition may be sent separately to the platform 200. However, in other circumstances the plurality of state transitions may be aggregated and wrapped together in a wrapper, and the wrapper may be transmitted to the platform 200. Thus, the payload of the wrapper may include the plurality of state transitions, and the plurality of state transitions may be sent from the first device 110 in a single communication rather than one-by-one. State transitions may also be referred to as items of information and may include state information of the physical device and/or resource information of the physical device.

The wrapper, which includes the plurality of items of information (e.g., state information and/or resource information) regarding the first device 110 may be transmitted to the platform 200 to synchronize a state of the first device 110 with corresponding first digital avatar 310. The payload containing the plurality of items of information sent by the first device 110 may be encrypted and/or signed by the first device 110. For example, the payload of the wrapper which includes the plurality of items of information may be signed and/or encrypted by the first device 110. That is, the information (or data) of the payload may itself be secured. The payload end-to-end security module 210 of the platform 200 may verify the signature and/or decrypt the plurality of items of information, for example the payload of the plurality of items of information.

Likewise, a payload including a plurality of items of information packaged in a packet or wrapper by the platform 200 may be signed and/or encrypted by the payload end-to-end security module 220 of the platform 200 when the plurality of items of information are sent from the platform 200 to the physical device corresponding to the digital avatar, for example, the first device 110. The physical device may verify the signature and/or decrypt the plurality of items of information, for example the payload of the plurality of items of information. The physical device may apply state transitions and/or configure the physical device according to the plurality of items of information included in the packet or wrapper.

For example, secure payload encryption and signing may be performed by the platform 200 and physical device using, for example, a Rivest-Shamir-Adleman (RSA) or Elliptic-curve cryptography (ECC) public key cryptography. This security scheme protects the information in transit between the digital avatar, platform, and physical device, for authenticity, integrity and confidentiality. For example, the security scheme described herein may allow unsecured and untrusted proxies to relay information between the platform 200, digital avatar, and physical device.

Each device resource of the physical device may have a specific permission access control. For example, the digital avatar may be limited to subscribe to a device resource to which the digital avatar is authorized to access. The protocol between the platform 200 and physical device provides a security scheme (for example, an authentication and authorization scheme) for subscriptions of the digital avatar to the device resources (corresponding to state information and/or resource information) of the physical device.

Device security manager 400 may store information for authenticating and authorizing communications between the physical devices and their corresponding digital avatars. For example, the device security manager 400 may store information about the keys which are used by the platform 200 for encrypting and decrypting, signing, and verifying a signature, of information (for example information of a payload) that is received from or transmitted to, the physical device. The device security manager 400 may generate and/or store keys for encryption and signing for a plurality of devices, for example for a plurality of IoT devices. The device security manager 400 may also store and/or manage the permissions regarding access control of the digital avatar to the device resources of the physical device. This scheme is designed to allow unsecured and untrusted proxies to relay the subscription requests end-to-end. For example, the device security manager 400 may include a storage, such as a database, and a processor to perform operations such as generating keys, managing permissions, and the like. The device security manager 400 may be part of platform 200 or may be located remotely from the platform 200.

Resource aggregator 220 may aggregate and wrap a plurality of items of information (e.g., state transitions including state information and/or resources of a physical device) in a single wrapper (also referred to as a packet or envelope). The plurality of items of information about the physical device pertain to a state of the physical device and may include an item of information regarding a resource or functionality of the physical device. For example, in the context of an image forming apparatus such as a printer, the items of information may include information about a power state (power status) of the image forming apparatus, an amount of resources available (e.g., toner state, paper amount), operating state information (e.g., error information, warnings, and the like), operating information (e.g., commands for performing an image forming operation), and the like.

The resource aggregator 220 may aggregate and wrap the plurality of items of information according to various conditions. For example, the resource aggregator 220 may be implemented when the network system is stressed so as to mitigate an impact of latency which may occur in the network due to connectivity issues and/or when numerous state transitions are to be implemented at the physical device within a short timeframe. For example, the resource aggregator 220 may be implemented according to a power state of the physical device. For example, if a physical device has been inactive or powered off for a threshold amount of time, the resource aggregator 220 may aggregate and wrap the plurality of items of information and transmit the wrapper to the physical device based on a condition of the physical device. For example, the resource aggregator 220 may aggregate and wrap the plurality of items of information and transmit the wrapper to the physical device based on a connectivity state of the device to the cloud computing network, or in response to a power state of the physical device being changed (e.g., changing from a power-off mode to a power-on mode, or changing from a sleep mode to a power-on mode, and the like). For example, the resource aggregator 220 may aggregate and wrap the plurality of items of information and transmit the wrapper to the physical device based on a condition of the cloud computing network. For example, the condition of the network may include a quality of the network and/or a number of nodes to be traversed from the platform 200 to the physical device.

The resource aggregator 220 may also function to unwrap and de-aggregate a plurality of items of information which are part of a payload of a wrapper transmitted from the physical device to the platform 200. In response to the plurality of items of information being de-aggregated and unwrapped, the digital avatar broker 230 may transmit the plurality of items of information to the corresponding digital avatar, for example, first digital avatar 310.

Digital avatar broker 230 may determine difference information based on a comparison of state information and/or resource information of the device with previous state information and/or previous resource information of the device. The difference information may correspond to changes (differences or updates) between the state information and/or resource information of the device and the previous state information and/or previous resource information. For example, instead of transmitting all of the items of information pertaining to the physical device to the digital avatar, deltas, that is the state information and/or resource information pertaining to the physical device that has changed, may be transmitted to the digital avatar. As another example, all of the items of information pertaining to the physical device may be transmitted to the digital avatar. For example, whether all of the information or the changed information of the physical device is transmitted, may be based on a negotiation between the platform 200 and the physical device, for example between the digital avatar broker 230 and the physical device.

Similarly, when transmitting to the physical device, instead of transmitting all of the items of information pertaining to the physical device, deltas may be transmitted to the physical device. As another example, all of the items of information pertaining to the physical device may be transmitted to the physical device. For example, whether all of the information or the changed information of the physical device is transmitted, may be based on a negotiation between the platform 200 and the physical device, for example between the digital avatar broker 230 and the physical device Platform 200 may subscribe to a physical device such that certain items of information (e.g., certain state information or resource information of the physical device) are to be aggregated and wrapped by the physical device and transmitted to the platform 200 according to the subscription of the platform 200. Subscription information of the platform 200 may be stored in a storage of the physical device.

Figure 2:
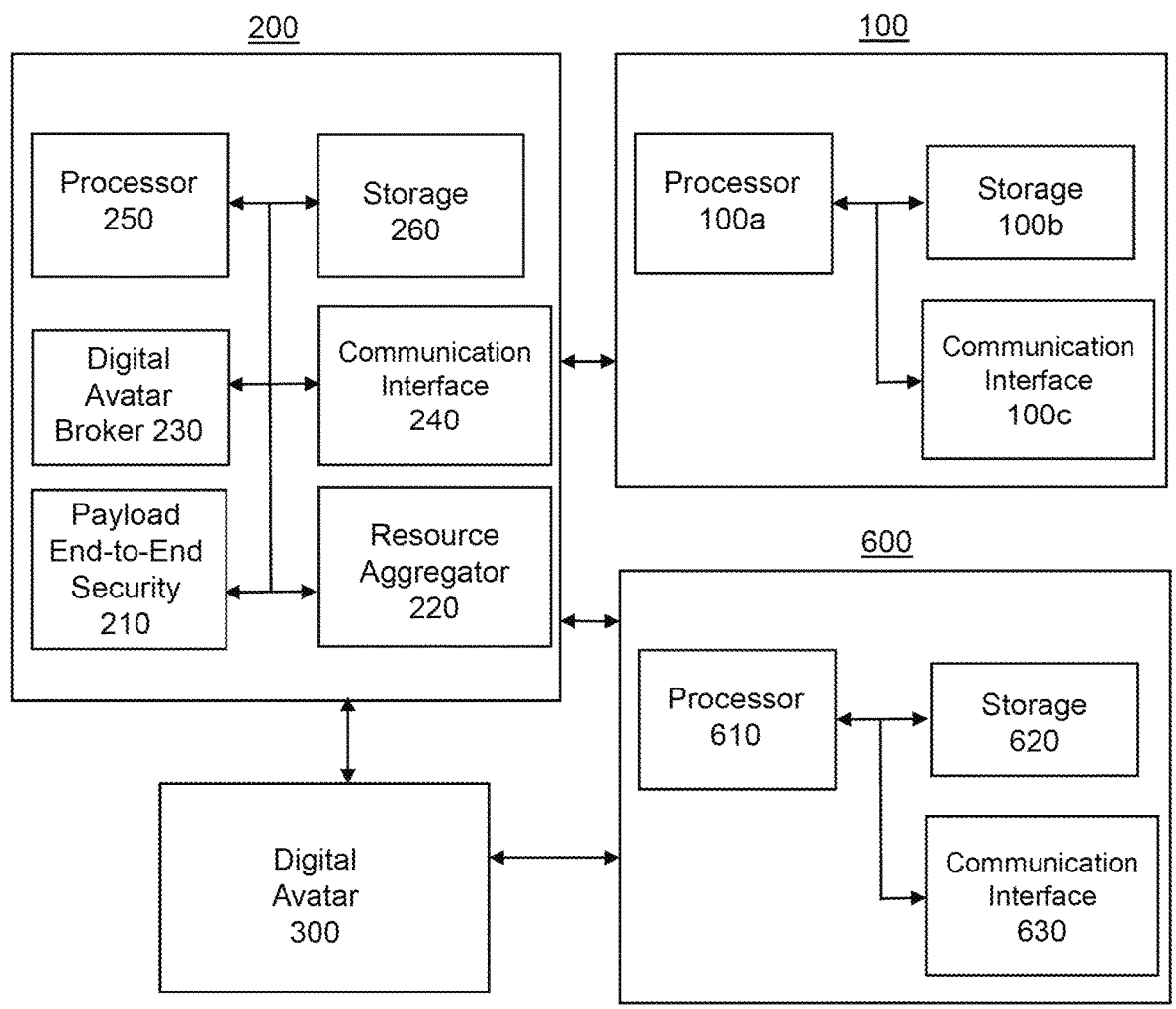
FIG. 2 is an example system in which a user can obtain a recommendation for a service level agreement.

Referring now to FIG. 2, an example block diagram of a network is illustrated according to an example of the disclosure.

The example system 2000 includes platform 200, physical device 100, client device 600, and digital avatar 300. For example physical device 100 may correspond to any of devices 110 through 150, and digital avatar 300 may correspond to any of digital avatars 310 through 340.

The platform 200 includes a payload end-to-end security module 210, resource aggregator 220, and digital avatar broker 230 as discussed above. Platform 200 may also include a communication interface 240, processor 250, and storage 260. The platform 200 may include a server, for example. For example, the platform 200 may provide a service by hosting a solution or application which is accessible by client device 600, where the digital avatar 300 is made accessible to the client device 600 via the solution or application. For example, the digital avatar 300 may be hosted by the platform 200. In another example, the digital avatar 300 may be hosted by another service provider on the cloud.

The client device 600 according to the examples described herein is remotely located from the platform 200 and physical device 100, and may include a computer, for example, a desktop or laptop computer, a smartphone, a tablet, and the like. The client device 600 may include a processor 610, storage 620, and communication interface 630.

The physical device 100 according to the examples described herein is remotely located from the platform 200 and client device 600, and may include an IoT device, for example. For example, physical device 100 may be connected to platform 200 via a plurality of intermediate devices. The physical device 100 may include a processor 100a, storage 100b, and communication interface 100c.

The processor 250 of the platform 200 may execute instructions stored in the storage 260. The processor 250 may include, for example, a processor, an arithmetic logic unit, a central processing unit (CPU), a graphics processing unit (GPU), a digital signal processor (DSP), an image processor, a microcomputer, a field programmable array, a programmable logic unit, an application-specific integrated circuit (ASIC), a microprocessor, or combinations thereof. Processor 100a of the physical device 100 and processor 610 of the client device 600 may have similar features as the processor 250.

The storage 260 of the platform 200 may include, for example, machine readable storage devices which may be any electronic, magnetic, optical, or other physical storage device that stores executable instructions. For example, the storage 260 may include a nonvolatile memory device, such as a Read Only Memory (ROM), Programmable Read Only Memory (PROM), Erasable Programmable Read Only Memory (EPROM), and flash memory, a USB drive, a volatile memory device such as a Random Access Memory (RAM), a hard disk, floppy disks, a blue-ray disk, or optical media such as CD ROM discs and DVDs, or combinations thereof. Storage 100b of the physical device 100 and storage 620 of the client device 600 may have similar features as the storage 260.

Platform 200 and physical device 100 may be connected to one another, for example through communication interfaces 240, 100c via a wired or wireless connection. Platform 200 and client device 600 may be connected to one another, for example through communication interfaces 240, 630 via a wired or wireless connection. A wireless connection between the platform 200 and physical device 100 and/or client device 600 may be over a network such as a local area network (LAN), wireless local area network (WLAN), wide area network (WAN), personal area network (PAN), virtual private network (VPN), or the like. For example, a wired communication connection between the platform 200 and physical device 100 and/or client device 600 may be performed via a pair cable, a coaxial cable, an optical fiber cable, an Ethernet cable, and the like.

Example operations will now be described with respect to FIG. 2.

For example, a user of client device 600 may access the digital avatar 300 over the internet, for example, via platform 200. The user may obtain information about the physical device 100 via the virtual representation of the physical device by the digital avatar 300. The user may request to configure (change a state of) the physical device 100 via the digital avatar 300 which may be hosted by platform 200.

In response to such a request, the digital avatar broker 230 may determine items of information to be aggregated and wrapped based on a comparison of previous state information of the physical device 100 and state information to be set to effect the requested configuration of the physical device 100. The resource aggregator 220 of the platform 200 may aggregate and wrap all of the plurality of items of information to change a state of the physical device 100 according to the requested configuration or aggregate and wrap those items of information which are changed or different from the items of information corresponding to the previous state information. The aggregated plurality of items of information may be wrapped in a wrapper by the resource aggregator 220 and the payload end-to-end security module 210 may encrypt and sign the payload including the plurality of items of information. The platform 200 may transmit the wrapper to the physical device 100 to synchronize the physical device 100 with the configuration of the digital avatar 300 as configured via the client device 600. The processor 250 may execute instructions stored in the storage (memory) 260 to cause the platform 200 to perform the functions of the payload end-to-end security module 210, resource aggregator 220, and the digital avatar broker 230, as described herein.

The physical device 100 may receive the wrapper from the platform 200, decrypt and verify the signature of the encrypted and signed payload, and unwrap and de-aggregate the plurality of items of information contained in the wrapper. The physical device 100, for example, the processor 100a, may configure the physical device 100 according to the items of information which may include state information and/or resource information regarding the physical device 100 to synchronize a state of the physical device 100 with the configuration of the digital avatar 300 as configured via the client device 600. Although not shown in FIG. 2, the physical device 100 may also include some or all of components which perform functions similar to the payload end-to-end security module 210, resource aggregator 220, and digital avatar broker 230. The processor 100a may execute instructions stored in the storage (memory) 100b to cause the physical device 100 to perform functions similar to the payload end-to-end security module 210, resource aggregator 220, and the digital avatar broker 230, as described herein.

According to another example, physical device 100 may experience a plurality of state transitions (items of information) which are to be reported to the platform 200 so that the state of the corresponding digital avatar 300 may be synchronized with the state of the physical device 100. The plurality of state transitions may correspond to a plurality of items of information which may be aggregated and wrapped together in a wrapper by the physical device 100. The payload containing the plurality of items of information may be encrypted and/or signed by the physical device 100. The wrapper including the plurality of items of information may be sent from the physical device 100 to the platform 200 in a single exchange (communication) rather than sending each item of information one-by-one.

As already discussed above, in response to the platform 200 receiving the wrapper, the payload end-to-end security module 210 may verify the signature and/or decrypt the payload containing the plurality of items of information, and de-aggregate and unwrap the plurality of items of information which are contained in the payload of the wrapper. The digital avatar broker 230 may transmit the plurality of items of information to the corresponding digital avatar, for example, digital avatar 300, so that the state of the digital avatar 300 may be synchronized with the state of the physical device 100.

The storage 100b of physical device 100 may include or store instructions which may correspond to policies that may be implemented by processor 100a to determine when to wrap a plurality of items of information rather than transmit each item of information one-by-one. For example, the physical device 100 may accumulate or store items of information in a buffer or cache for a threshold period of time and/or until a threshold number of items of information are stored, at which point the items of information may be aggregated and wrapped in the wrapper. For example, the physical device 100 may accumulate or store items of information in the buffer or cache in response to a quality of a network connection being less than a threshold value. The physical device 100 may aggregate and wrap the items of information in a wrapper and transmit the wrapper to the platform 200 when the quality of the network connection is greater than the threshold value. For example, the physical device 100 may accumulate or store items of information in the buffer or cache when the physical device experiences a threshold number of state transitions (e.g., changes in state or resources) within a threshold period of time, the items of information may be aggregated and wrapped in the wrapper, and the wrapper may be transmitted to the platform 200. For example, the physical device 100 may accumulate or store items of information in the buffer or cache when a number of nodes to be transited from the physical device 100 to the platform 200 is greater than a threshold value, and the items of information may be aggregated and wrapped in the wrapper, and the wrapper may be transmitted to the platform 200. For example, the physical device 100 may accumulate or store items of information in the buffer or cache at a designated time or at designated intervals of time, and the items of information may be aggregated and wrapped in the wrapper, and the wrapper may be transmitted to the platform 200.

Figure 3:
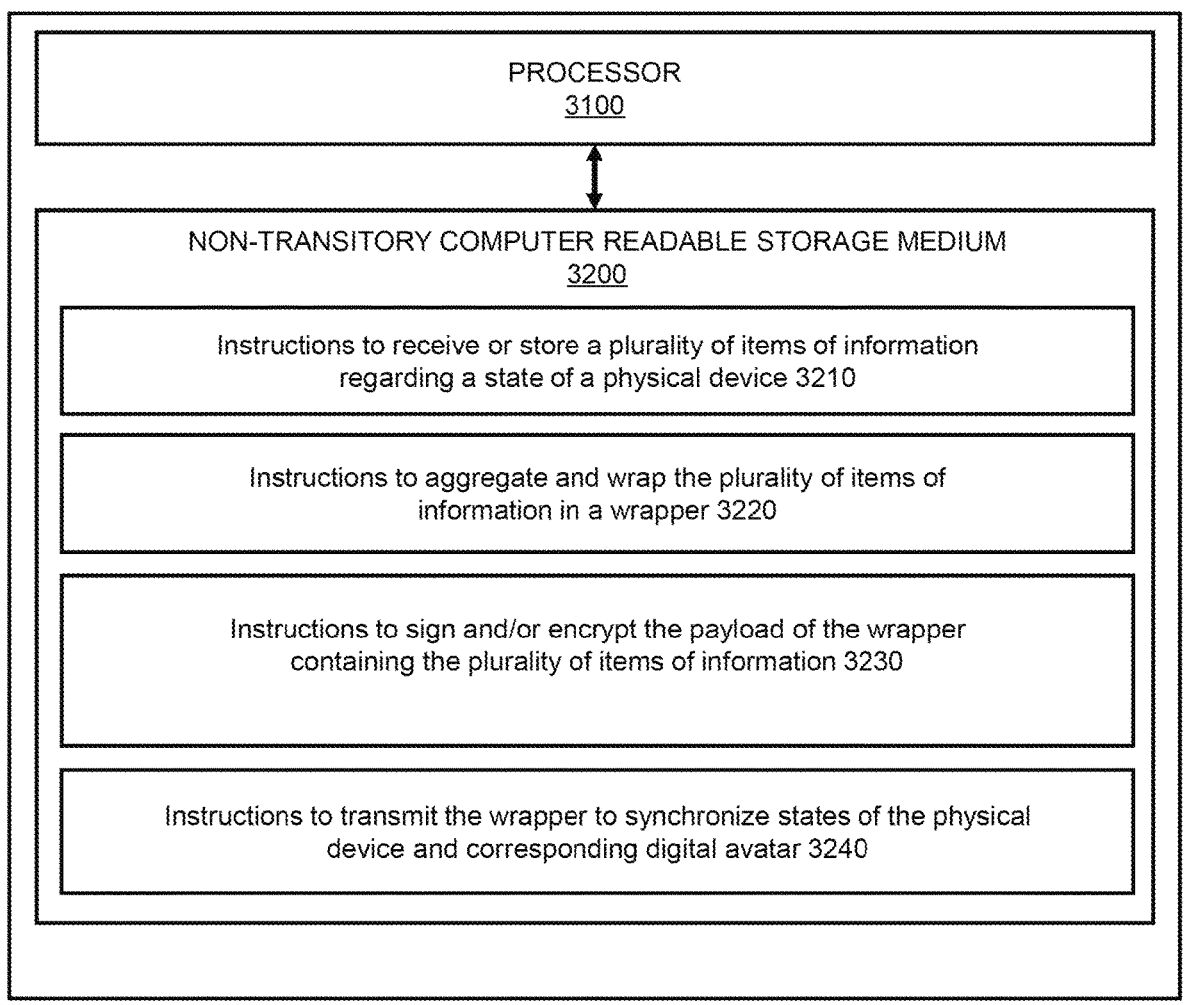
FIG. 3 is an example apparatus for obtaining a recommendation for a service level agreement.

FIG. 3 illustrates an example apparatus 3000 for synchronizing a state of a physical device with a state of a digital avatar, according to the examples described herein.

In an example, the apparatus 3000 may be the physical device 100 or platform 200. The apparatus 3000 includes processor 3100 and non-transitory computer readable storage medium 3200. The non-transitory computer readable storage medium 3200 may include instructions 3210, 3220, 3230, and 3240 that, when executed by the processor 3100, cause the processor 3100 to perform various functions.

The instructions 3210 include instructions to receive or store a plurality of items of information regarding a state of a physical device, for example, in the non-transitory computer readable storage medium 3200. The instructions 3220 include instructions to aggregate and wrap the plurality of items of information in a wrapper. The instructions 3230 include instructions to sign and/or encrypt the payload of the wrapper containing the plurality of items of information. The instructions 3240 include instructions to transmit the wrapper to synchronize states of the physical device and corresponding digital avatar. For example, the wrapper may be transmitted to the platform from the physical device, or the wrapper may be transmitted to the physical device from the platform, according to the examples described herein.

Figure 4:
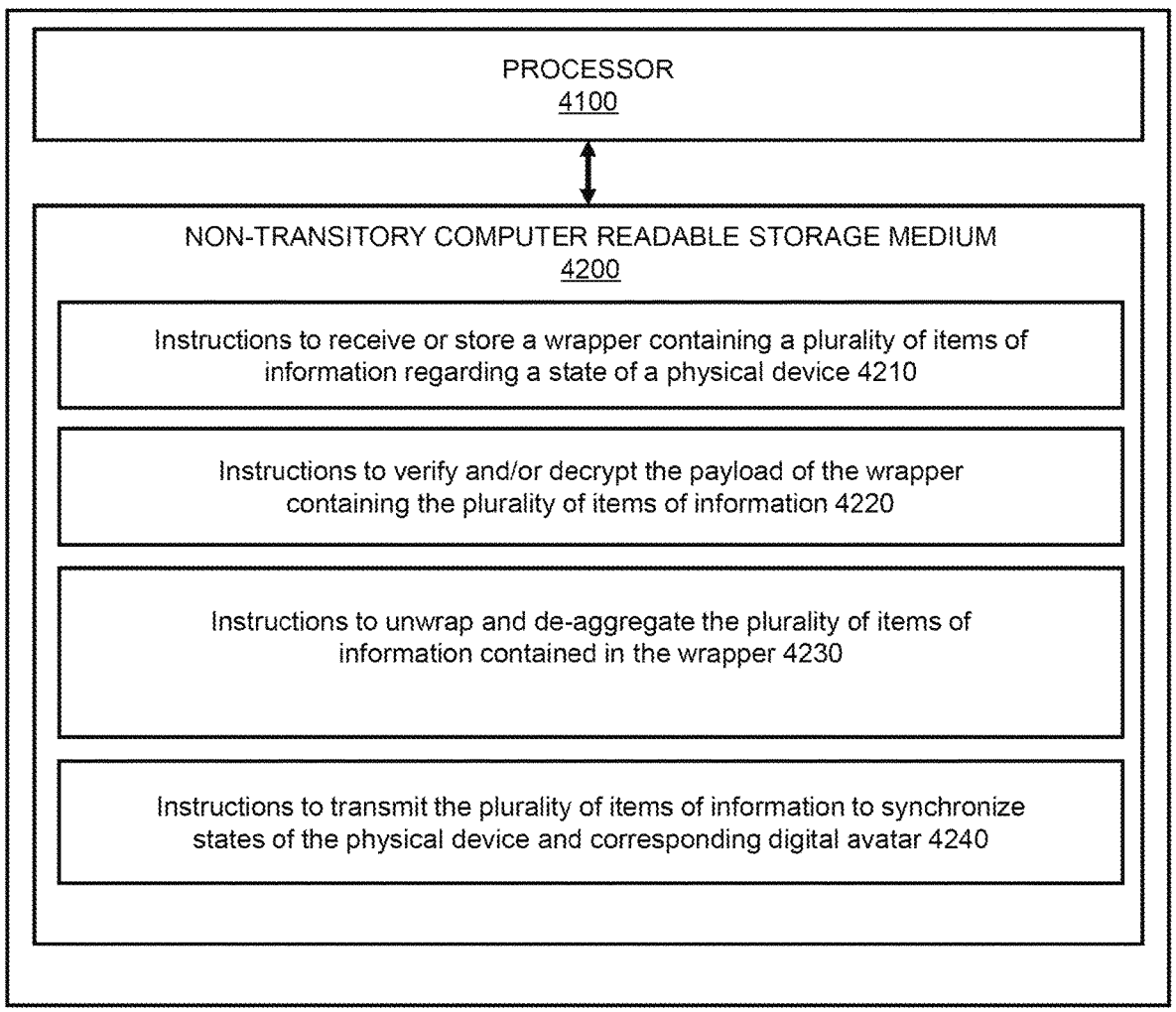
FIG. 4 is an example workflow for obtaining a recommendation for a service level agreement.

FIG. 4 illustrates an example apparatus 4000 for synchronizing a state of a physical device with a state of a digital avatar, according to the examples described herein.

In an example, the apparatus 4000 may be the physical device 100 or platform 200. The apparatus 4000 includes processor 4100 and non-transitory computer readable storage medium 4200. The non-transitory computer readable storage medium 4200 may include instructions 3210, 3220, 3230, and 3240 that, when executed by the processor 4100, cause the processor 4100 to perform various functions.

The instructions 4210 include instructions to receive or store a wrapper containing a plurality of items of information regarding a state of a physical device, for example, in the non-transitory computer readable storage medium 4200. The instructions 4220 include instructions verify and/or decrypt the payload of the wrapper containing the plurality of items of information. The instructions 4230 include instructions to unwrap and de-aggregate the plurality of items of information contained in the wrapper. The instructions 4240 include instructions to transmit the plurality of items of information to synchronize states of the physical device and corresponding digital avatar. For example, the plurality of items of information may be transmitted to the digital avatar from the platform when the platform unwraps and de-aggregates the contents of the wrapper. For example, the plurality of items of information may be transmitted internally within the physical device when the physical device unwraps and de-aggregates the contents of the wrapper.

Additional instructions may be stored on a non-transitory computer readable storage medium of the physical device 100 and/or the platform 200. For example, the non-transitory computer readable storage medium may include instructions to determine when to aggregate and wrap the plurality of items of information according to various conditions as described herein. For example, the non-transitory computer readable storage medium may include instructions to compare state and/or resource information of the physical device reflected in the items of information with previous state and/or resource information of the physical device to determine delta (difference) information. For example, the non-transitory computer readable storage medium may include instructions to aggregate and wrap items of information which are subscribed to by the platform 200.

Figure 5:
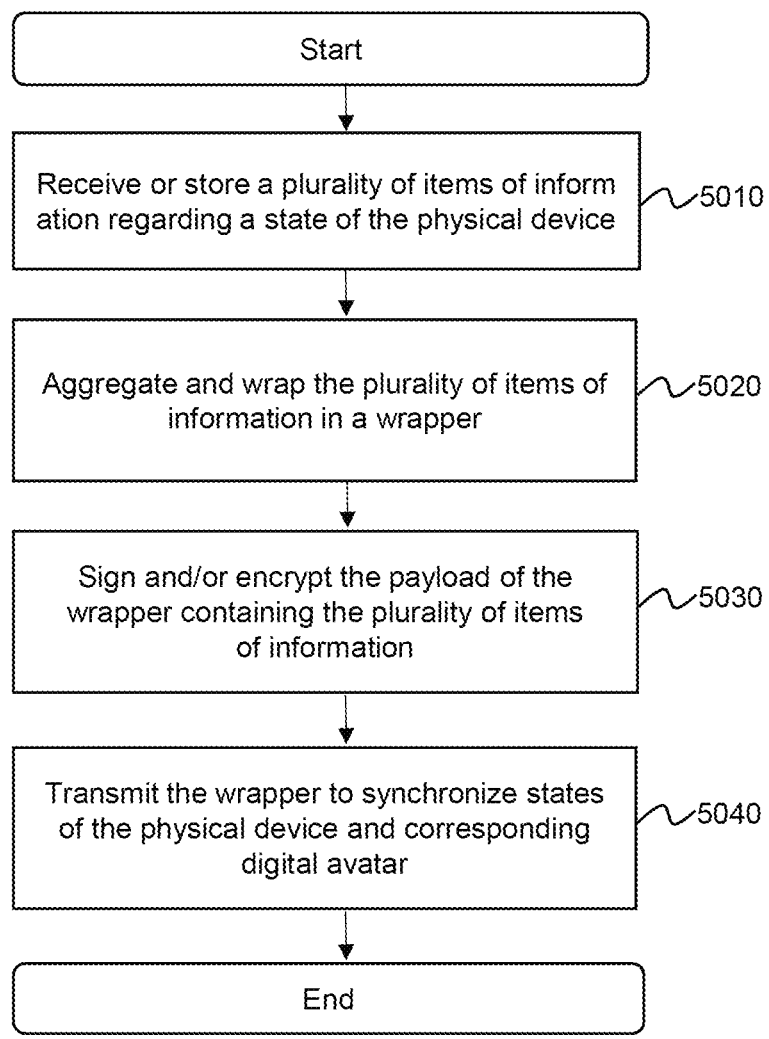
FIG. 5 is an example chart illustrating performance limits of different features of a software application captured by stress tests executed over different software application releases.

FIG. 5 illustrates an example workflow 5000 for synchronizing a state of a physical device with a state of a digital avatar, according to the examples described herein.

Referring to FIG. 5, at operation 5010 the physical device 100 may receive or store a plurality of items of information regarding a state of the physical device 100. At operation 5020, the physical device 100 may aggregate and wrap the plurality of items of information in a wrapper. At operation 5030, the physical device 100 may sign and/or encrypt the payload of the wrapper containing the plurality of items of information. At operation 5040, the physical device may transmit the wrapper to the platform 200 to synchronize states of the physical device 100 and corresponding digital avatar 300. The platform 200 may perform operations similar to operations 5010 through 5040 according to the examples described herein and therefore these operations will not be repeated for the sake of brevity.

Figure 6:
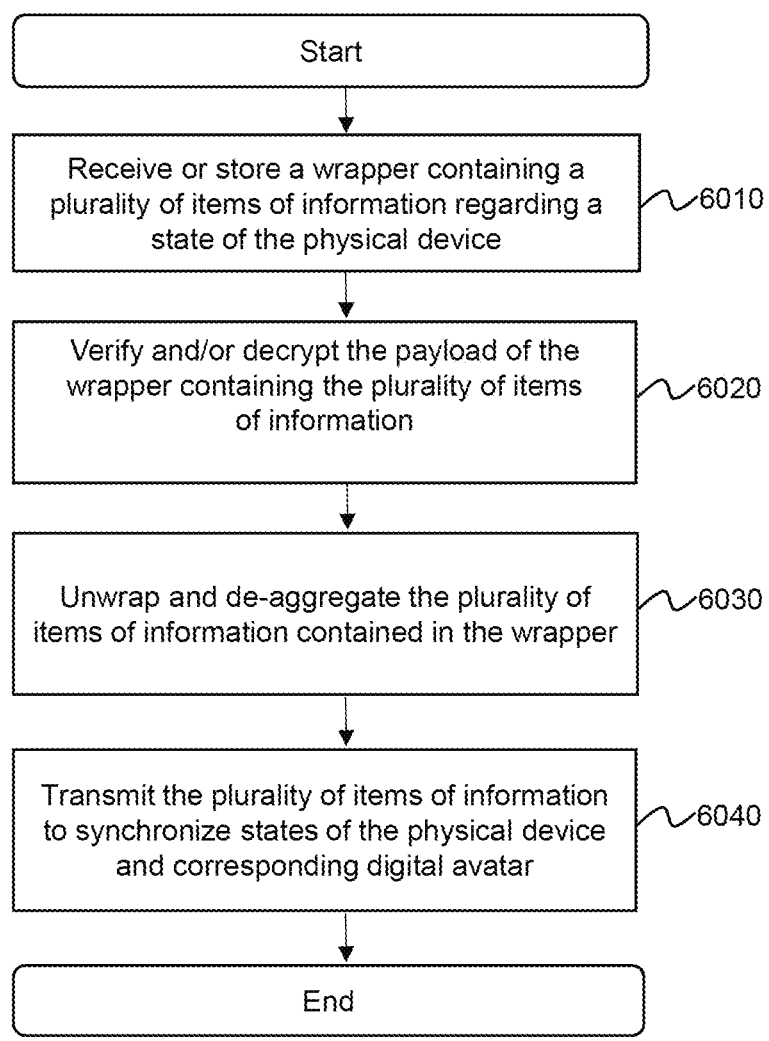
FIG. 6 is an example chart illustrating performance limits of a specific feature of a software application, or of the software application overall, as captured by stress tests executed over different software application releases.

FIG. 6 illustrates an example workflow 6000 for synchronizing a state of a physical device with a state of a digital avatar, according to the examples described herein.

Referring to FIG. 6, at operation 6010 the platform 200 may receive or store a wrapper containing a plurality of items of information regarding a state of a physical device 100. At operation 6020, the platform 200 may verify and/or decrypt the payload of the wrapper containing the plurality of items of information. At operation 6030, the platform 200 may unwrap and de-aggregate the plurality of items of information contained in the wrapper. At operation 6040, the platform 200 may transmit the wrapper to the corresponding digital avatar 300 to synchronize states of the physical device 100 and the corresponding digital avatar 300. The physical device 100 may perform operations similar to operations 6010 through 6040 according to the examples described herein and therefore these operations will not be repeated for the sake of brevity.

Referring to FIG. 7, an example request communicated from the physical device to the platform, is illustrated according to an example of the disclosure.

With reference to FIG. 7, the request 7000 may include information 7010 which indicates the sequence number of an item among the items of information (number of objects) included in the wrapper 7050. For example information 7010 indicates by sequence number that it is the third item of information (third object) included in the wrapper 7050. In the example of FIG. 7, the items of information 7020, 7030, and 7040 pertain to resource information of the physical device. The request may also include security or authorization information 7060 regarding the payload of the wrapper 7050. The wrapper may include other information, for example metadata regarding the items of information. For example, the other information may include time stamp information, information regarding a type of action, and sequence information to keep track of events. In the example of FIG. 7, the wrapper 7050 and payload level security may conform to the JavaScript Object Notation (JSON) web encryption (JWE) format and key management. However, the disclosure is not so limited and other schema or formats may be utilized than that shown in FIG. 7.

Referring to FIG. 8, an example response communicated from the platform to the physical device, is illustrated according to an example of the disclosure.

With reference to FIG. 8, the response 8000 may include an item of information 8010 contained in a wrapper 8020 which pertains to resource information of the physical device. Although the example wrapper 8020 illustrated in FIG. 8 shows a single item of information, the wrapper 8020 may include a plurality of items of information as in the example of FIG. 7. In the example of FIG. 8, the wrapper 8020 and payload level security may conform to the JavaScript Object Notation (JSON) web encryption (JWE) format and key management. However, the disclosure is not so limited and other schema or formats may be utilized than that shown in FIG. 8.

In some cloud computing networks, physical devices may need to connect directly to the cloud platform and try to maintain a persistent connection, the physical devices may not be able to support other devices without Wifi or Ethernet/LAN technologies, and the physical devices may not ensure end-to-end data security and therefore do not support topologies with unsecure proxy nodes. For example, the physical devices may not be configured to aggregate or de-aggregate items of information regarding the device, and therefore a plurality of transactions or communications are needed to update the digital avatar or physical device. Synchronization of each resource and/or state may be time, bandwidth, and cost consuming.

According to the examples disclosed herein, the aggregation and wrapping of items of information may optimize the transfer of changes to state information and resource information of the physical device to the platform and back. Physical devices according to the examples described herein, may be part of complex network topologies where some devices (e.g., low end devices without Ethernet or Wifi/LAN technologies) are not permitted or capable of accessing the cloud directly. Described herein are methods for aggregating and wrapping items of information to minimize the number of exchanges between the physical device and its digital avatar, thereby decreasing a time (latency) for updating the digital avatar or physical device, optimizing bandwidth usage, and decreasing costs. Further, according to the examples described herein payload level security for the items of information contained in the payload may be achieved end-to-end.

The term "module" as used herein, may refer to, but is not limited to, a software or hardware component or device, such as a Field Programmable Gate Array (FPGA) or Application Specific Integrated Circuit (ASIC), which performs certain tasks. A module may be configured to reside on an addressable storage medium and configured to execute on a processor. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Executable instructions to perform processes or operations in accordance with the above-described examples may be recorded in a machine readable storage. A controller or processor may execute the executable instructions to perform the processes or operations. Examples of instructions include both machine code, such as that produced by a compiler, and files containing higher level code that may be executed by the controller or processor using an interpreter. The machine readable storage may be distributed among computer systems connected through a network and computer-readable codes or instructions may be stored and executed in a decentralized manner.

Each block of the flowchart illustrations may represent a module, segment, or portion of code, which comprises one or more executable instructions for implementing the specified logical function(s). In some examples, the functions noted in the blocks may occur out of order. For example, two blocks shown in succession may be executed substantially concurrently (simultaneously) or the blocks may sometimes be executed in the reverse order, depending upon the functionality involved.

The foregoing examples are merely examples and are not to be construed as limiting the disclosure. The disclosure can be readily applied to other types of apparatuses. Various modifications may be made which are also intended to be encompassed by the disclosure. Also, the description of the examples of the disclosure is intended to be illustrative, and not to limit the scope of the claims.

What is claimed is:

1. A server, comprising:
a memory to store instructions; and
a processor, coupled to the memory, to execute the instructions to cause the server to:
receive a wrapper which includes a plurality of items of information, the plurality of items of information being encrypted and pertaining to a state of a device which is remotely located from the server, and including at least one item of information regarding a resource or functionality of the device,
decrypt the wrapper including the plurality of items of information,
unwrap and de-aggregate the plurality of items of information from the wrapper, and
transmit the plurality of items of information to a digital avatar which virtually represents the device to synchronize a state of the digital avatar with the state of the device.

2. The server of claim 1, wherein when a configuration of the device is to be changed according to the state of the digital avatar, the processor is to execute the instructions to cause the server to:
aggregate and wrap a second plurality of items of information in a second wrapper, the second plurality of items of information pertaining to the state of the device and including at least one item of information regarding the resource or functionality of the device,
encrypt and/or sign the second wrapper, and
transmit the second wrapper to the device to synchronize the state of the device with the state of the digital avatar.

3. The server of claim 1, wherein the processor is to execute the instructions to cause the server to:
determine difference information based on a comparison of state information and/or resource information of the device with previous state information and/or previous resource information of the device, and
the plurality of items of information transmitted to the digital avatar correspond to the difference information.

4. The server of claim 1, wherein
a payload contains the plurality of items of information, and
the processor is to decrypt the payload and verify a signature of the payload.

5. The server of claim 4, wherein the processor is to decrypt and/or verify the signature of the payload based on at least one key remotely stored in a storage of a device security manager, the at least one key being used to decrypt the payload and/or verify the signature of the payload.

6. The server of claim 1, wherein the digital avatar is hosted by the server.

7. The server of claim 6, wherein
the digital avatar is to subscribe to device resources of the device, the device resources corresponding to information regarding the resources or functionality of the device, and
the processor is to transmit the plurality of items of information to the digital avatar when the device resources subscribed to by the digital avatar correspond to the plurality of items of information.

8. A device, comprising:
a memory to store instructions; and
a processor, coupled to the memory, to execute the instructions to cause the device to:
aggregate and wrap together in a wrapper a plurality of items of information, the plurality of items of information pertaining to a state of the device including at least one item of information regarding a resource or functionality of the device,
encrypt the wrapper including the plurality of items of information, and
transmit the wrapper to a remotely located cloud platform, to synchronize a state of a digital avatar hosted by the cloud platform with the state of the device, the digital avatar virtually representing the device.

9. The device of claim 8, wherein
the memory is to store subscription information regarding items of information to which the cloud platform subscribes, and
the device is to aggregate and wrap together in the wrapper items of information based on the subscription information.

10. The device of claim 8, wherein when a configuration of the device is to be changed according to the state of the digital avatar, the processor is to execute the instructions to cause the device to:
receive a second wrapper from the cloud platform which includes a second plurality of items of information, the second plurality of items of information being encrypted and pertaining to the state of the device and including at least one item of information regarding the resource or functionality of the device,
decrypt the second wrapper including the second plurality of items of information, and
change the configuration of the device based on the second plurality of items of information to synchronize the state of the device with the state of the digital avatar.

11. The device of claim 8, wherein
a payload contains the plurality of items of information, and
a payload level security of the payload conforms to a JavaScript Object Notation web encryption format.

12. A method, comprising:
receiving, at a server, a wrapper which includes a plurality of items of information, the plurality of items of information being encrypted and pertaining to a state of a device which is remotely located from the server;
unwrapping and de-aggregating the plurality of items of information from the wrapper; and
transmitting the plurality of items of information to a digital avatar which virtually represents the device to synchronize a state of the digital avatar with the state of the device.

13. The method of claim 12, further comprising:
receiving a request to change a configuration of the device;

aggregating and wrapping a second plurality of items of information in a second wrapper, the second plurality of items of information pertaining to the state of the device; and transmitting, based on a condition of a network and/or of the device, the second wrapper to the device to synchronize the state of the device with the state of the digital avatar.

14. The method of claim 13, wherein the condition of the network includes at least one of a quality of the network or a number of nodes to be traversed from the server to the device, and the condition of the device includes at least one of a power state of the device or a connectivity state of the device to the network.

15. The method of claim 12, further comprising:

determining difference information based on a comparison of state information and/or resource information of the device with previous state information and/or previous resource information of the device, and wherein the plurality of items of information transmitted to the digital avatar correspond to the difference information.

* * * * *